(12) United States Patent
Koo

(10) Patent No.: US 9,491,567 B2
(45) Date of Patent: Nov. 8, 2016

(54) PROVIDING M2M DATA TO UNREGISTERED TERMINAL

(71) Applicant: KT CORPORATION, Gyeonggi-do (KR)

(72) Inventor: Bum-Mo Koo, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/196,906

(22) Filed: Mar. 4, 2014

(65) Prior Publication Data

US 2014/0256285 A1  Sep. 11, 2014

(30) Foreign Application Priority Data

Mar. 5, 2013 (KR) .................. 10-2013-0023315

(51) Int. Cl.
| | | |
|---|---|---|
| *H04W 4/00* | (2009.01) | |
| *H04W 4/24* | (2009.01) | |
| *H04W 12/04* | (2009.01) | |
| *H04L 29/06* | (2006.01) | |
| *H04W 12/06* | (2009.01) | |

(52) U.S. Cl.
CPC .......... *H04W 4/005* (2013.01); *H04L 65/1073* (2013.01); *H04W 4/24* (2013.01); *H04L 65/1006* (2013.01); *H04W 12/04* (2013.01); *H04W 12/06* (2013.01)

(58) Field of Classification Search
CPC ... H04W 4/005; H04W 12/06; H04W 12/04; H04W 12/08; H04L 67/12; H04L 2209/80; H04L 65/1006; H04L 65/1073
See application file for complete search history.

(56) References Cited

U.S. PATENT DOCUMENTS

| | | | |
|---|---|---|---|
| 5,377,267 A * | 12/1994 | Suzuki | .................. H04L 9/3271 340/5.74 |
| 6,009,461 A | 12/1999 | Yamano | |
| 6,970,183 B1 | 11/2005 | Monroe | |
| 7,363,003 B2 | 4/2008 | Takatani et al. | |
| 8,676,195 B2 * | 3/2014 | Zhang | ............... H04L 29/06027 370/328 |
| 2002/0175819 A1 | 11/2002 | Joo | |
| 2003/0037170 A1 | 2/2003 | Zeller et al. | |
| 2004/0125789 A1 | 7/2004 | Parker et al. | |
| 2005/0021785 A1 | 1/2005 | Nakaji | |
| 2006/0066900 A1 | 3/2006 | Abe et al. | |
| 2006/0172766 A1 | 8/2006 | Kim et al. | |
| 2006/0173708 A1 | 8/2006 | Vining et al. | |
| 2007/0058789 A1 | 3/2007 | Lim et al. | |
| 2007/0153993 A1 | 7/2007 | Cohen | |
| 2007/0224997 A1* | 9/2007 | Florkey | ................... H04M 3/02 455/445 |

(Continued)

FOREIGN PATENT DOCUMENTS

| | | |
|---|---|---|
| JP | 2003-116181 A | 4/2003 |
| JP | 2005-135245 A | 5/2005 |

(Continued)

*Primary Examiner* — Matthew Sams
(74) *Attorney, Agent, or Firm* — IP Legal Services, LLC

(57) ABSTRACT

The disclosure is related to a method of providing M2M data to an unregistered user terminal. The method may include receiving a request message from a first user terminal registered at the M2M service server to provide predetermined data collected from a M2M device to a second user terminal, determining whether the second user terminal is a subscriber of the M2M service server, temporary registering the second user terminal when the second user terminal is not a subscriber of the M2M service server, and providing the predetermined data to the second user terminal.

17 Claims, 8 Drawing Sheets

(56) References Cited

U.S. PATENT DOCUMENTS

| | | |
|---|---|---|
| 2007/0273499 A1 | 11/2007 | Chlubek et al. |
| 2009/0060514 A1* | 3/2009 | DiChiro ............ G08C 17/02 398/106 |
| 2009/0217364 A1* | 8/2009 | Salmela ............ H04W 12/06 726/6 |
| 2010/0002582 A1* | 1/2010 | Luft ............ H04W 74/0866 370/230.1 |
| 2010/0011063 A1 | 1/2010 | Blaiotta et al. |
| 2010/0127850 A1 | 5/2010 | Poder |
| 2010/0138484 A1 | 6/2010 | Lee et al. |
| 2010/0146117 A1* | 6/2010 | Hoeksel ............ H04W 4/005 709/225 |
| 2010/0177663 A1* | 7/2010 | Johansson ............ H04W 4/00 370/254 |
| 2010/0318913 A1* | 12/2010 | Cupala ............ G06F 3/0481 715/719 |
| 2011/0090334 A1 | 4/2011 | Hicks, III et al. |
| 2011/0235520 A1 | 9/2011 | Maciej et al. |
| 2011/0264914 A1* | 10/2011 | Bae ............ H04L 63/06 713/170 |
| 2011/0265158 A1 | 10/2011 | Cha et al. |
| 2011/0321147 A1 | 12/2011 | Chakra et al. |
| 2012/0004003 A1 | 1/2012 | Shaheen et al. |
| 2012/0124228 A1 | 5/2012 | Yu et al. |
| 2012/0131338 A1 | 5/2012 | Bellwood et al. |
| 2012/0203905 A1* | 8/2012 | Lee ............ H04L 69/28 709/225 |
| 2012/0207113 A1 | 8/2012 | Yoon et al. |
| 2013/0094494 A1 | 4/2013 | Lim et al. |
| 2013/0142118 A1 | 6/2013 | Cherian et al. |
| 2013/0212236 A1* | 8/2013 | Foti ............ G06F 15/177 709/221 |
| 2013/0246519 A1 | 9/2013 | Foti |
| 2013/0295983 A1 | 11/2013 | Kim et al. |
| 2013/0332554 A1 | 12/2013 | Lee et al. |
| 2014/0006612 A1 | 1/2014 | Fallon et al. |
| 2014/0006629 A1 | 1/2014 | Lau et al. |
| 2014/0038549 A1* | 2/2014 | Lehane ............ H04W 24/02 455/406 |
| 2014/0220951 A1* | 8/2014 | Gumbrell ............ H04W 4/005 455/418 |
| 2014/0242940 A1* | 8/2014 | Koo ............ H04L 67/125 455/406 |
| 2014/0244834 A1* | 8/2014 | Guedalia ............ H04L 67/16 709/224 |
| 2014/0256285 A1* | 9/2014 | Koo ............ H04W 4/005 455/406 |
| 2015/0055557 A1* | 2/2015 | Dong ............ H04W 4/005 370/328 |

FOREIGN PATENT DOCUMENTS

| | | |
|---|---|---|
| JP | 2009-239727 A | 10/2009 |
| KR | 10-2006-0089030 A | 8/2006 |
| KR | 10-2006-0096602 A | 9/2006 |
| KR | 10-0673165 B1 | 1/2007 |
| KR | 10-2008-0024481 A | 3/2008 |
| KR | 10-2008-0050044 A | 6/2008 |
| KR | 10-2009-0051933 A | 5/2009 |
| KR | 10-0909542 B1 | 7/2009 |
| KR | 10-2010-0029383 A | 3/2010 |
| KR | 10-2010-0061406 A | 6/2010 |
| KR | 10-2011-0133709 A | 12/2011 |
| KR | 10-2012-0050738 A | 5/2012 |
| KR | 10-2012-0056401 A | 6/2012 |
| KR | 10-2012-0093559 A | 8/2012 |
| KR | 10-2012-0098899 A | 9/2012 |

* cited by examiner

PROVIDING M2M DATA TO UNREGISTERED TERMINAL

CROSS REFERENCE TO PRIOR APPLICATIONS

The present application claims priority under 35 U.S.C. §119 to Korean Patent Application No. 10-2013-0023315 (filed on Mar. 5, 2013), which is hereby incorporated by reference in its entirety.

The subject matter of this application is related to U.S. patent application Ser. No. 13/966,615 filed Aug. 14, 2013, and U.S. patent application Ser. No. 14/190,800 filed on Feb. 26, 2014, the teachings of which are incorporated herein their entirety by reference.

BACKGROUND

The present disclosure relates to providing data to an unregistered user terminal and, more particularly, to transferring machine to machine (M2M) data to a user terminal registered at a different M2M service platform through Internet Protocol multimedia subsystem (IMS).

Machine to machine (M2M) communication has enabled many convenient features and services. One of the convenient features and services provided through M2M communication is a remote controlling system. A typical remote controlling system remotely monitors a target area and controls one of a M2M device based on the monitoring results using M2M communication technology.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, different M2M service platforms may be enabled to exchange data to each other through existing IP multimedia subsystem (IMS) while following European telecommunications standards institute (ETSI) standards.

In accordance with another aspect of the present invention, M2M data may be routed one M2M service platform to the other using an existing IMS platform.

In accordance with at least one embodiment, a method may be provided for providing data collected from a machine to a machine (M2M) device by a M2M service server to an unregistered user terminal. The method may include receiving a request message from a first user terminal registered at the M2M service server to provide predetermined data collected from a M2M device to a second user terminal, determining whether the second user terminal is a subscriber of the M2M service server, temporary registering the second user terminal when the second user terminal is not a subscriber of the M2M service server, and providing the predetermined data to the second user terminal.

The temporary registering may include transmitting a temporal registration request message to the second user terminal through a first communication service platform of the first user terminal and a second communication service platform of the second user terminal and performing the temporary registering upon receipt of a registration request message from the second user terminal. The temporal registration message may be an session initiation protocol (SIP) message that includes at least one of information on an address of the second communication service platform, a temporary ID of the second user terminal, and an encryption key. The transmitting a temporal registration request message may include determining domain information on a second communication network of the second user terminal from a flexible number routing & number portability (FNPS) server and transmitting the temporal registration request message to the second user terminal using the determined domain information of the second communication network.

The temporary registering the second user terminal may further include generating an encryption key for sharing the control right with the second user terminal, creating a temporal registration request message including the generated encryption key, transmitting the temporal registration request message to the second user terminal, and performing an authentication process upon receipt of a registration request message from the second user terminal.

The performing an authentication process may include comparing the generated encryption key with an encryption key included in the registration request message from the second user terminal.

The providing the predetermined data to the second user terminal may include transcoding the predetermined data based on information on the second user terminal included in the temporal registration request message. The method may further include transmitting a notification message to the second user terminal to inform that the predetermined data is ready to be provided.

The method may further include modifying a resource of the M2M service server to temporarily register the second user terminal. That is, the method may further include assigning a temporal identification to the second user terminal, adding the temporal identification of the second user terminal in an <applications> resource, adding the temporal identification of the second user terminal in an <accessRights> to allow the second user terminal to access the predetermined data, and modifying a <subscriptions> resource to transmit a notification message to the second user terminal when the predetermined data is ready to be provided.

The method may further include calculating a fee of providing the predetermined data to the second user terminal, requesting a server to perform an associated accounting process based on the calculated fee, and charging at least one of the first user terminal and the second user terminal based on the calculated fee for providing the predetermined data to the second user terminal.

In accordance with at least one embodiment, a machine to machine (M2M) service server may provide data collected from at least one M2M device to an unregistered user terminal. Such a server is configured to receive a request message from a first user terminal registered at the M2M service server to provide predetermined data collected from a M2M device to a second user terminal, to determine whether the second user terminal is a subscriber of the M2M service server, to temporarily register the second user terminal when the second user terminal is not a subscriber of the M2M service server, and to provide the predetermined data to the second user terminal.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
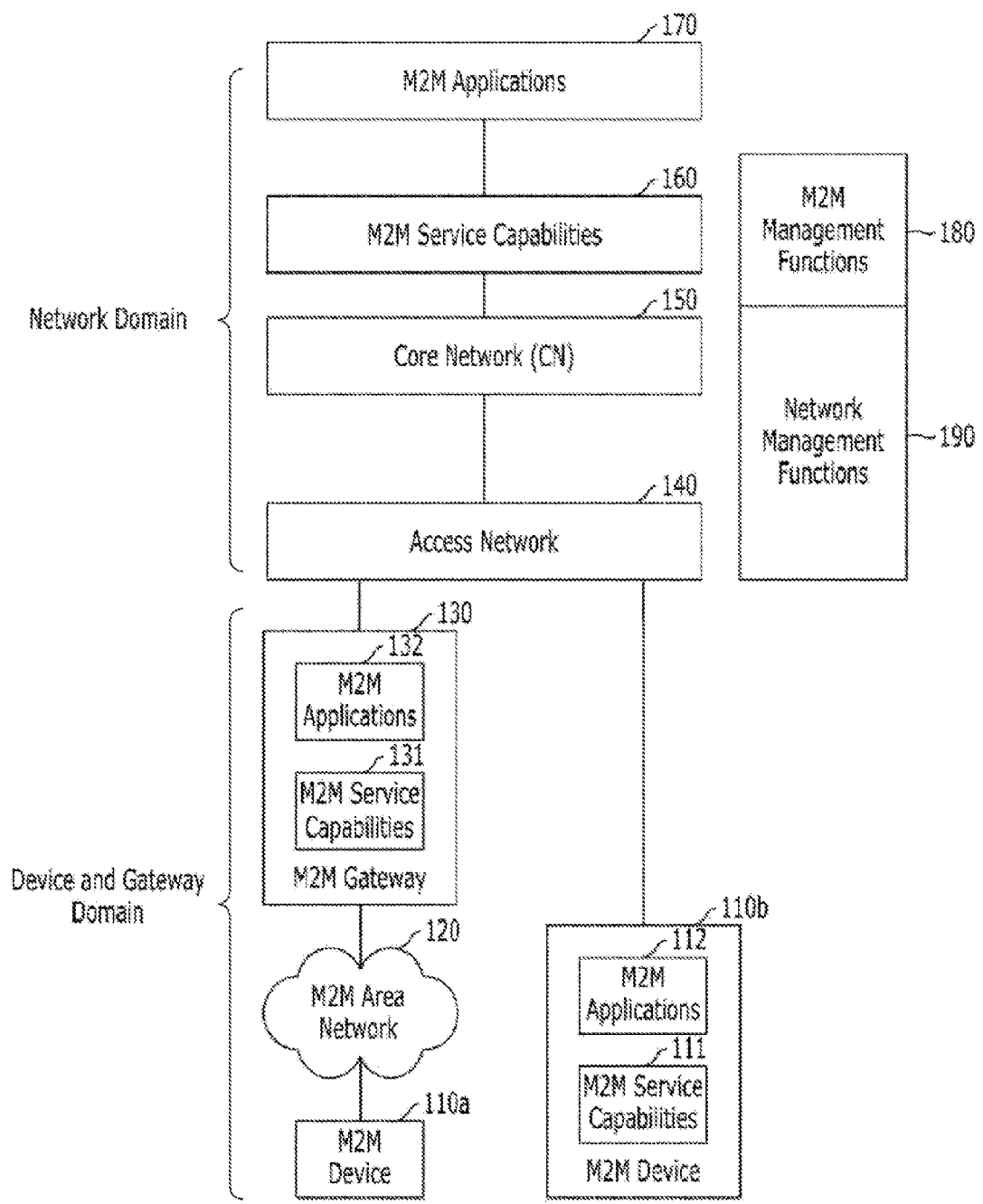
FIG. 1 illustrates a typical architecture for M2M services according to ETSI standard.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, data collected from a M2M device of one M2M service platform may be provided to a user terminal registered at the other M2M service platform. Hereinafter, an architecture for providing M2M services will be described with reference to FIG. 1

FIG. 1 illustrates a typical architecture for M2M services according to ETSI standard.

Referring to FIG. 1, M2M devices 110a and 110b are terminals that perform communication without human intervention or in a state in which human intervention is minimized. In particular, M2M devices 110a and 110b may refer to any type of devices that send and forward data stored therein, in response to an external request or automatically.

According to the ETSI standard, in the case that M2M device 110b directly connects to access network 140, M2M device 110b may run M2M applications 112 using M2M service capabilities (SCs) 111. Herein, the M2M applications 112 may be referred to as "device applications (DAs)." Meanwhile, M2M device 110a may connect to access network 140 via M2M gateway 130. In this case, M2M device 110a may use M2M service capabilities (SCs) 131 of M2M gateway 130.

M2M area network 120 may provide connectivity between M2M device 110a and M2M gateway 130. For example, M2M area network 120 may include a personal area network (PAN) and/or a local area network (LAN), but is not limited thereto. The PAN may include IEEE 802.15.x, Zigbee, Bluetooth, IETF ROLL, ISA100.11a, and so forth. The LAN may include PLC, M-BUS, Wireless M-BSU, KNX, and so forth. M2M gateway 130 may run M2M applications 132 using M2M service capabilities (SCs) 131. Herein, M2M applications 132 may be referred to as "gateway applications (GAs). M2M gateway 130 may act as a proxy between M2M device 110a and access network 140.

Access network 140 may allow M2M device 110b and/or M2M gateway 130 to communicate with core network (CN) 150. For example, access network 140 may include an xDSL network, a hybrid fiber coaxial (HFC) network, a FTTH network, a PLC network, a satellite network, GERAN, UTRAN, eUTRAN, Wireless LAN, and/or a WiMAX (Wi-Bro) network, but is not limited thereto.

Core network (CN) 150 may provide IP connectivity, an access network control, network/service control functions, an interconnection with other networks, roaming functions, and so forth. For example, core network 150 may include 3GPP CN, ETSI TISPAN CN, 3GPP2 CN, and/or IP multimedia subsystem (IMS), but is not limited thereto.

M2M service capabilities (SCs) 160 in a network domain may provide functions that are to be shared by different applications, and environments that allow access to other service capabilities through open interfaces. The use of such M2M service capabilities may make it possible to develop and deploy optimized applications without considering characteristics of lower network layers.

M2M applications 170 of the network domain may run M2M service logic and use M2M service capabilities through an open interface provided in the M2M system. Herein, M2M applications 170 may be referred to as "network applications (NAs)."

Referring to FIG. 1, the network domain may include M2M management functions 180 and network management functions 190. M2M management functions 180 may include all the functions required to manage M2M service capabilities 160 in the network domain. The management of the M2M devices (e.g., 110a, 110b) and the M2M gateways (e.g., 130) may use a specific M2M service capability. Network management functions 190 may include all the functions required to manage access network 140 and core network 150. Network management functions 190 may include a variety of functions such as a provisioning, supervision, fault management, and so forth.

According to the ETSI standard, M2M service capabilities 160 in the network domain may be referred to as a network service capabilities layer (NSCL). M2M service capabilities 131 in M2M gateway 130 may be referred to as a gateway service capabilities layer (GSCL). M2M service capabilities (e.g., 111) in M2M devices (e.g., 110a, 110b) may be referred to as a device service capabilities layer (DSCL). NSCL 160, GSCL 131, and DSCL 111 may be collectively referred to as a service capabilities layer (SCL). NSCL 160 may refer to individual platforms established for services by M2M service providers. Herein, NSCL 160 may be a platform which is individually implemented per each service by an M2M service provider. In the present embodiment, a specific server providing a specific service may correspond to NSCL 160.

A M2M service is provided through a M2M service platform (e.g., a M2M server) which may be established within a predetermined communication service network. In general, the M2M service platform and the predetermined communication service network are established by the same communication service provider, such as Verizon or AT&T.

Accordingly, a M2M service of one service provider cannot be provided to a user terminal registered at a different service provider, typically. That is, when a user terminal is a subscriber of one communication service provider or of one M2M service provider, such a user terminal cannot be participated in a M2M service provided by another M2M service provider or through a communication service network of another communication service provider. In accordance with at least one embodiment, a M2M service system provides a M2M service not only to a user terminal registered in the same service platform but also to a user terminal registered in a different service platform.

For convenience and ease of understanding, an unregistered user terminal is referred to as a user terminal not registered at the same M2M service server of a registered user terminal or at the same communication service network of a registered user terminal. Such an unregistered user terminal may be registered at a M2M service server or a communication service network provided by a service provider different from that of a registered user terminal. Hereinafter, a M2M service system for providing a M2M service to an unregistered user terminal will be described with reference to FIG. 2.

Figure 2:
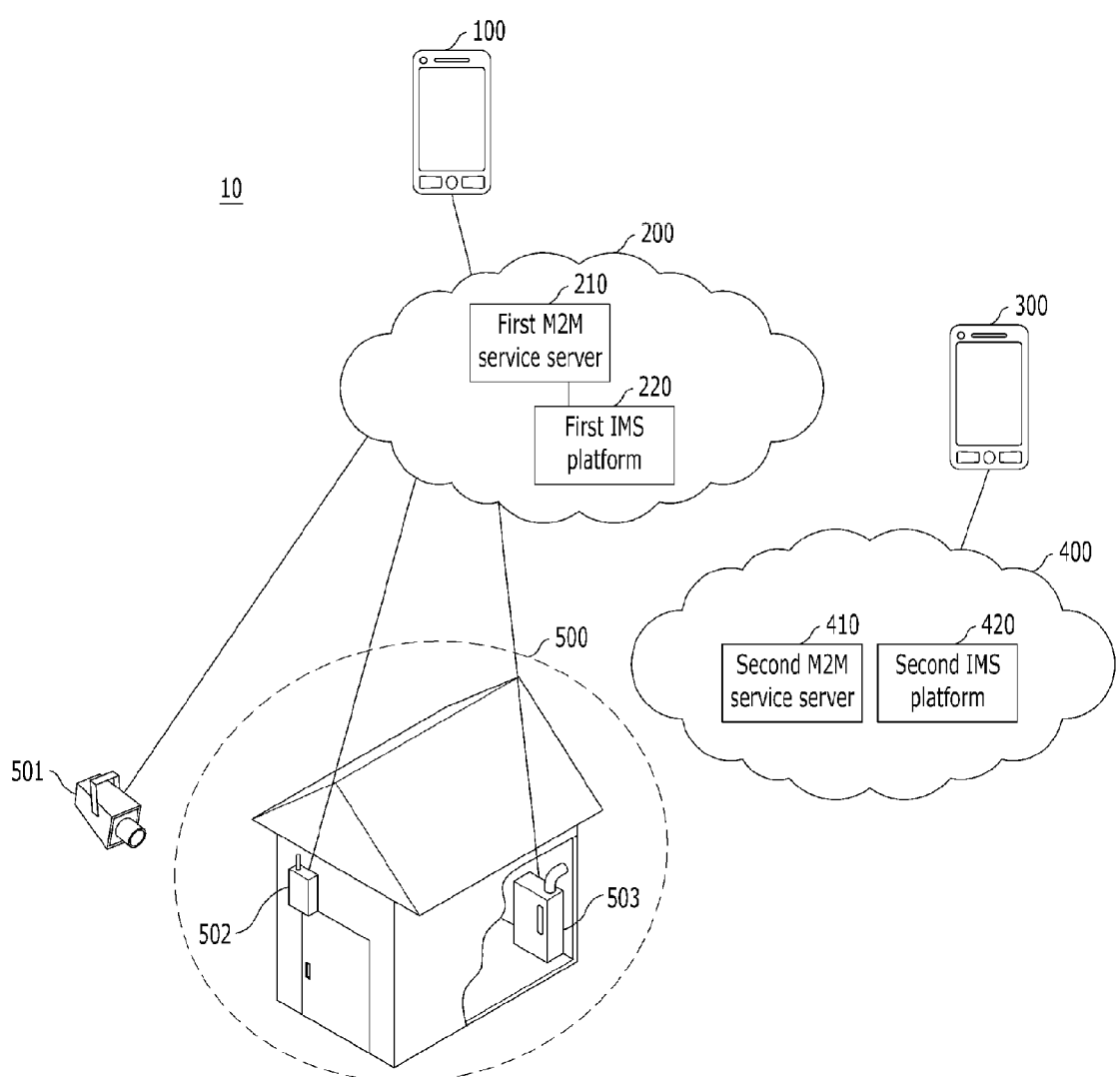
FIG. 2 illustrates a M2M service system for providing M2M data to user terminals in a different service platform in accordance with an exemplary embodiment.

FIG. 2 illustrates a M2M service system for providing M2M data to user terminals in a different service platform in accordance with an exemplary embodiment.

Referring to FIG. 2, M2M service system 10 may include first user terminal (e.g., registered user terminal) 100, first M2M service server 210, first IP multimedia subsystem (IMS) platform 220, third user terminal (e.g., unregistered user terminal) 300, second M2M service server 410, second IMS platform 420, and a plurality of M2M devices 501 to 503. First M2M service server 210 and first IMS platform 220 belong to first communication service network 200 and second M2M service server 410 and second IMS platform 220 belong to second communication service network 400. That is, first M2M service server 210 and first IMS platform 220 may be established by a communication service provider of first communication service network 200. Second M2M service server 410 and second IMS platform 420 may be established by a communication service provider of second communication service network 400, which is different from that of first communication service network 400.

First user terminal 100 is provided with a desired M2M service from first M2M service server 210 in corporation with first IMS platform 220 through first communication service network 200. For example, first user terminal 100 is a user terminal of a subscriber who subscribes a M2M service of M2M service server 210. First user terminal 100 may be referred to as a registered user terminal. That is, registered user terminal 100 may control M2M devices 501 to 503 through M2M service server 210 and IMS platform 220. Such registered user terminal 100 is coupled to M2M service server 210 through first communication service network 200.

M2M devices 501 to 503, first user terminal 100, third user terminal 300, and M2M service server 210 may have an associated network application or a M2M application in order to cooperate with each other based on a M2M protocol. In addition, M2M devices 501 to 503, first user terminal 100, third user terminal 300, and server 210 may commonly employ a service capability layer (SCL) or a common service entity (SEC) for general control of M2M communication and for storing and managing information for authentication and communication among other parties in M2M communication.

M2M devices 501 to 503 may be deployed at around target area 500. Such M2M devices 501 to 503 may sense activities and incidents occurring in target area 500 and provide such sensing results to M2M service server 210 as context information on target area 500. Target area 500 may be various places to be monitored. For example, target area 500 may be home, an office unit, or an entire building. M2M devices 501 to 503 may be any devices capable of sensing activities and incidents occurring at target area 500 and communicating with other parties including M2M service server 210 and neighbor devices. For example, M2M devices 501 to 503 may include a closed-circuit television (CCTV), a security camera, a motion sensor, a temperature controller, a light controller, a fire detector, a gas detector, a temperature sensor, a humidity sensor, a pressure sensor, a gyro sensor, a velocity sensor, and so forth.

Such M2M devices 501 to 503 may be used for sensing various activities such as intrusion, illegal entry, fire, abnormal temperature or humidity, flood, and so forth. Also, M2M devices 510 to 503 may be used for controlling devices in target area 500. In order to sense such activities, devices 110 may collect context information of target area 100. For example, a security camera (e.g., M2M device 501) captures images of activities in target area 500 or a temperature sensor (e.g., M2M device 502) senses temperature in target area 500. After collecting such context information, M2M devices 501 and 502 transmits the collected context information to M2M service server 210 through communication network 200.

First M2M service server 210 may be coupled to M2M devices 501 to 503 through first communication service network 200 and receive context information of target area 500 from M2M devices 501 to 503. M2M service server 210 may be a M2M network service capability layer (NSCL) or a M2M common service entity (CSE), but the present invention is not limited thereto. First M2M service server 210 may manage and process the context information and stores the context information such as a time of collecting the context information, an associated device, an associated subscriber, and so forth. In accordance with at least one embodiment, first M2M service server 210 may provide data related to a M2M service not only to registered user terminal 100 of a subscriber of first communication service network 200 but also to unregistered user terminal 300 of a subscriber of second communication service network 400 by transferring M2M data through IMS platforms.

First user terminal 100 may be registered at first M2M service server 210 and used for controlling M2M devices 501 to 503 in connection with first M2M service server 210. Furthermore, first user terminal 100 may be registered at first communication service network 200. First user terminals 100 may be devices capable of communication through various types of networks and interaction with first IMS platform 220.

Furthermore, first user terminal 100 may be required to have a predetermined application program such as a network application or a M2M application for the desired M2M service. Particularly, a predetermined service application may be downloaded from first M2M service server 210 and installed at first user terminal 100 for the M2M service in accordance with at least one embodiment. For example, first user terminal 100 may include a smart phone, a pad-type device, a personal computer (PC), a tablet PC, a laptop PC, personal data assistance (PDA), a personal multimedia player (PMP), and so forth. In accordance with at least one embodiment, first user terminal 100 requests first M2M service server 210 to provide selected data collected from at least one of M2M devices 501 to 503 to third user terminal 300 (e.g., unregistered user terminal).

First IMS platform 220 is a network system for delivering Internet Protocol based multimedia data such as audio data and video data. Through first IMS platform 220, a corresponding communication service provider performs various operations including authentication, authorization, and accounting processes. A communication service provider establishes an own IMS platform and provides various services through the own IMS platform, such as a voice over LTE (VoLTE) service, a packet switch video telephone (PSVT) service, a media CID (MCID), a rich communication-suite (RCS) service, and an intelligent network service. Furthermore, first IMS platform 220 may mutually link first user terminal 100 to third user terminal 300 through second IMS platform 420 which is established by a different communication service provider.

Third user terminal 300 may be registered at second M2M service server 410 and second IMS platform 420. That is, third user terminal 300 is registered as a subscriber at second communication service network 400. Third user terminal 300 may be devices capable of communication through various types of networks and interaction with second IMS platform 420.

Third user terminal 300 is registered at second communication service network 400 which is established by a communication service provider different from that of first communication service network 200. In view of first user terminal 100, third user terminal 300 is an unregistered user terminal. Accordingly, third user terminal 200 cannot directly have a M2M service provided by first M2M service server 210.

Typically, first M2M service server 210 cannot provide a M2M service to an unregistered user terminal, for example, third user terminal 300 that is registered at a M2M service platform different from first M2M service platform 210. That is, first M2M service server 210 cannot provide M2M data collected at least one from M2M devices 501 to 503 to a user terminal unregistered at first communication service network 200 or first M2M service platform 210.

It is because a communication service provider establishes an independent M2M service platform not compatible with a M2M service platform of the other communication service provider. However, a user frequently wants to use a M2M device provided by other communication service provider. For example, a subscriber of first M2M service platform 210 wants to transfer video data or audio data of monitoring home 500, collected from M2M device 501, to the subscriber' family member who is a subscriber of second communication service network 400. When a subscriber realizes that a thief is trying to steal valuables in home 500 through a M2M monitoring service received through first M2M service server 210, the subscriber might want to transfer such monitoring data to a 3$^{rd}$ person (e.g., police officer) who is a subscriber of other communication service provider. In this case, typically, first M2M service platform 210 cannot provide such a service to third user terminal 300.

In accordance with at least one embodiment, not only a registered user terminal but also an unregistered user terminal (e.g., third user terminal 300) is enabled to be provided with M2M service data of another service provider. That is, M2M service data may be provided to an unregistered user through an IMS platform. Such operation will be described with reference to FIG. 3.

Figure 3:
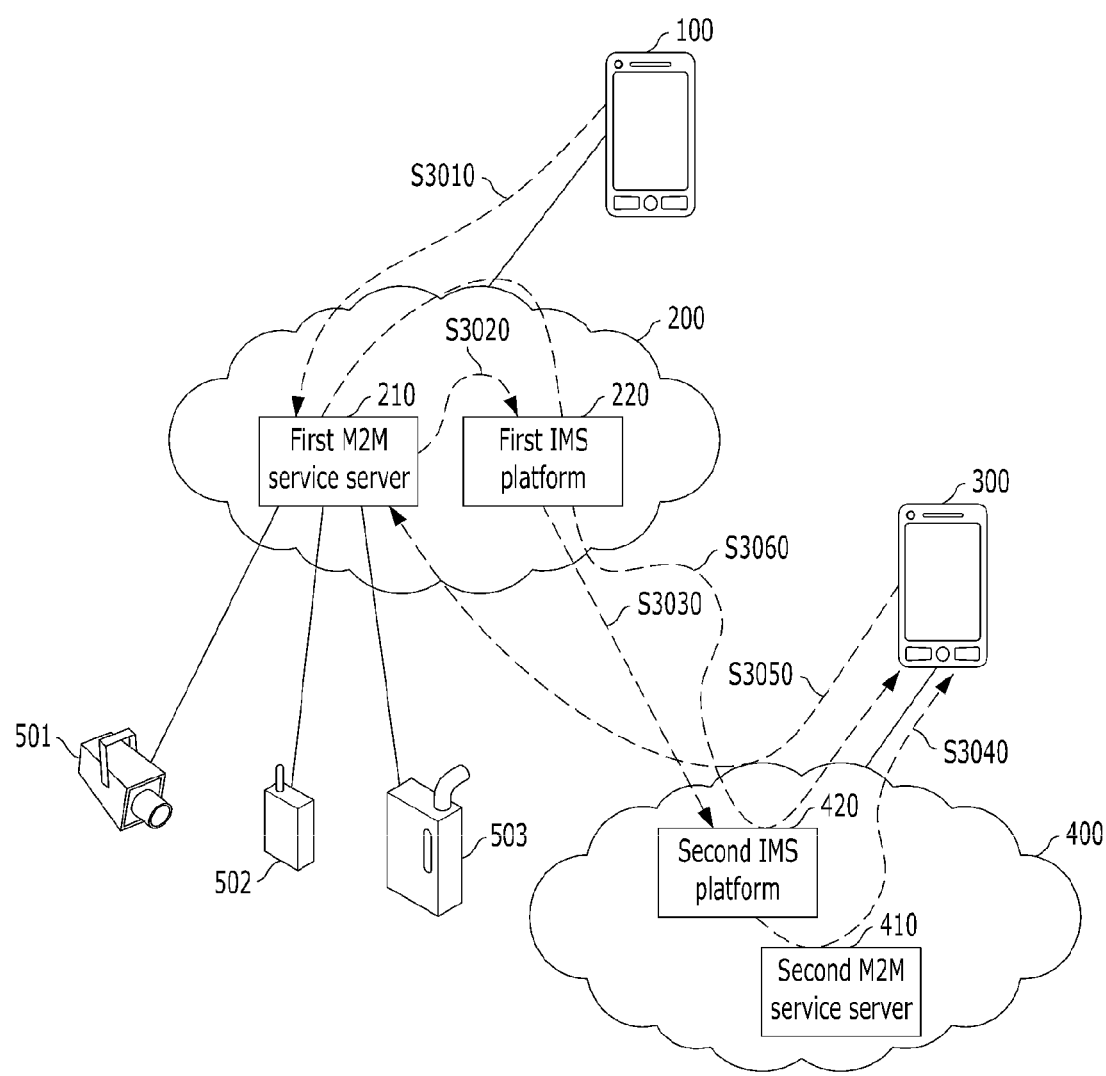
FIG. 3 illustrates overall operation for providing M2M data to an unregistered user terminal in accordance with at least one embodiment.

FIG. 3 illustrates overall operation for providing M2M data to an unregistered user terminal in accordance with at least one embodiment.

Referring to FIG. 3, an IP multimedia subsystem (IMS) platform is a network system for delivering Internet Protocol based multimedia data (packet based service) such as audio data and video data. Through such an IMS platform, a corresponding communication service provider performs various operations including authentication, authorization, and accounting processes. A communication service provider establishes an own IMS platform and provides various services through the own IMS platform. The IMS platform may link a user terminal to a different IMS platform established by a different communication service provider.

In accordance with at least one embodiment, such an IMS platform may be used to transfer data related to a M2M service provided by first M2M service server 210 to third user terminal 300 registered at second M2M service server 410. First user terminal 100 may be installed with a network application (NA) provided by first M2M service server 210 and registered at first M2M service server 210 or first communication service network 200. Third user terminal 300 may be installed with a network application (NA) provided by second M2M service server 410 and registered at second M2M service server 410 or second communication service network 400. First M2M service server 210 and second M2M service server 410 use different communication service networks 200 and 400.

First user terminal 100 and second user terminal 200 may include a session initiation protocol (SIP) client for a SIP based multimedia service such as voice, video, and chanting service in connection with corresponding IMS platforms 220 and 420. Furthermore, first user terminal 100 and second user terminal 200 may include network applications (NA) for M2M services provided by corresponding M2M service platforms 210 and 410.

At step S3010, first user terminal 100 transmits a request message to first M2M service server 210 to provide predetermined data collected from at least one of M2M devices 501 to 503 to third user terminal 300. Such a request message may include information on third user terminal 300, information on a target M2M device, and designated M2M data to be provided.

At step S3020, first M2M service server 210 determines whether third user terminal 300 is a subscriber of first M2M service server 210 in response to the request message from first user terminal 100. As described, third user terminal 300 is a user terminal not registered at first M2M service server 210. Accordingly, third user terminal 300 is an unregistered user terminal. That is, third user terminal 300 is a subscriber of second communication service network 400 including second M2M service server 410 and second IMS platform 420.

At step S3030, first M2M service server 210 searches for a hosting communication service network of third user terminal 300 based on information included in the request message since third user terminal 300 is an unregistered user terminal. For example, first M2M service server 210 may connect to second IMS platform 420 and obtain necessary information on third user terminal 300 through second IMS platform 420.

At step S3040, first M2M service server 210 detects second communication service network 400 as the hosting communication service network and transmits a temporal registration request message to third user terminal 300 through second M2M service server 410.

At step 3050, third user terminal 300 transmits a temporary registration request message to first M2M service server 210. In response to the temporal registration request message, first M2M service server 210 determine whether third user terminal 300 is a user terminal that first user terminal 100 requested to provide predetermined M2M data of at least one M2M device 501 to 503. First M2M service server 210 temporarily registers third user terminal 300 and transmits a temporal registration confirmation message to third user terminal 300. As registering, first M2M service server 210 may assign a unique identification number (ID) to third user terminal 300 and modify a corresponding <scl> resource to assign an access right to third user terminal 300.

At step S3060, first M2M service server 210 may transcode the requested data stored in first M2M service server 210 in real time and sends a notification message to third user terminal 300. In response to the notification message, third user terminal 300 obtains the coded M2M data from first M2M service server 210 through first IMS platform 220 and second IMS platform 420. After obtaining the requested data, first M2M service server 210 terminates the established SIP session and data path to second IMS platform 420. Then, first M2M service server 210 performs an accounting process to charge for data exchanged between first M2M service server 210 and third user terminal 300.

Figure 4:
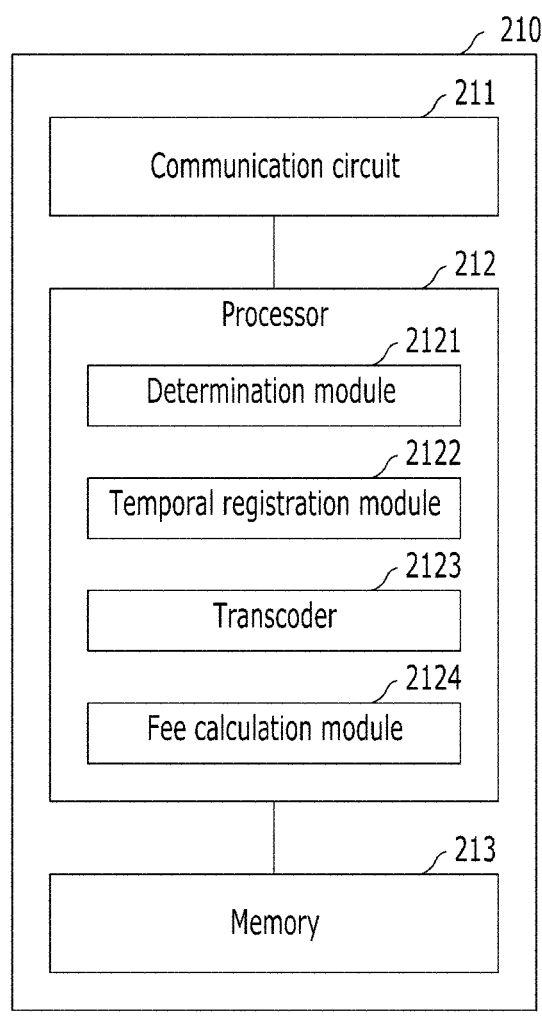
FIG. 4 illustrates a M2M service server for provide M2M data to unregistered user terminals in accordance with at least one embodiment.

FIG. 4 illustrates a M2M service server for provide M2M data to unregistered user terminals in accordance with at least one embodiment.

Referring to FIG. 4, M2M service server 210 may include communication circuit 211, processor 212, and memory 213. Processor 212 may include determination module 2121, temporal registration module 2122, transcoder 2123, and fee calculation module 2124.

Communication circuit 211 may establish a communication link to at least one of user terminals 100 and 300, first M2M service server 210, second M2M service server 410, first IMS platform 210, second IMS platform 420, and M2M devices 501 to 503. Through the established link, communication circuit 211 may receive information from or transmit information to at least one of user terminals 100 and 300, first M2M service server 210, second M2M service server 410, first IMS platform 210, and second IMS platform 420 for providing data collected from at least one of M2M devices 501 to 503. For example, communication circuit 211 perform communication based on Digital Subscriber Line (xDSL), Hybrid Fiber Coaxial (HFC), Power Line Communication (PLC), satellites, GSM EDGE Radio Access Network (GERAN), UMTS Terrestrial Radio Access Network (UTRAN), evolved UMTS Terrestrial Radio Access Network (eUTRAN), Wireless Local Area Network (WLAN), and Worldwide Interoperability for Microwave Access (WiMAX), or a mobile communication network based on CDMA/WCDMA or GSM/GPRS.

Memory 213 may is data storage storing information necessary for driving M2M service server 210 and performing certain operation upon generation of a predetermined event. Such information may include any software programs and related data. Memory 213 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto.

Processor 212 may control overall operation of the constituent elements of M2M service server 210. In accordance with at least one embodiment, processor 212 may include determination module 2121, temporal registration module 2122, transcoder 2123, and fee calculation module 2124. Such modules may be implemented as software module, but the present invention is not limited thereto. Such modules may be implemented as hardware circuits.

Determination module 2121 may determine whether a user terminal is registered at own M2M service server 210 or registered at another M2M service server. For example, first user terminal 100 wants to transfer data collected from a predetermined M2M device to third user terminal 300. In this case, first user terminal 100 transmits a requests message to M2M service server 210 for transferring data collected from a predetermined M2M device to third user terminal 300. In response to such request, determination module 2121 may determine whether third user terminal 300 is registered at first M2M service sever 210. Since third user terminal 300 is registered at second M2M service server 410, determination module 212 may determine that third user terminal 300 is an unregistered user terminal 300.

Temporal registration module 2122 may generate a temporal registration request message when third user terminal 300 is an unregistered user terminal as the determination result. Temporal registration module 2122 may transmit the generated temporal registration request message to third user terminal 300 through a M2M service server of third user terminal 300, which is second M2M service server 410.

Transcoder 2123 may transcode the requested data collected from the predetermined M2M device in real time. That is, transcoder 2123 may convert the request data stored in first M2M service provider to a predetermined format data to be processable in at least one of second M2M service server 410, second IMS platform 420, and third user terminal 300. After transcoding, transcoder 2123 may transmit a notification message to third user terminal 300 to inform of third user terminal 300 that requested data is available.

Fee calculation module 2124 may calculate a fee for all data exchanged between a user terminal and a M2M service platform in an IMS network and charge the user terminal based on the calculated fee. When providing a M2M service to an unregistered user terminal (e.g., third user terminal 300), fee calculation module 2124 may charge the original owner of a M2M device (e.g., first user terminal 100) for data exchanged between third user terminal 300 and first M2M service server 210. However, the present invention is not limited thereto. Such a target user terminal to charge may be determined based on a user selection of any of user terminals participating in transferring data collected from a predetermined M2M device.

Figure 5:
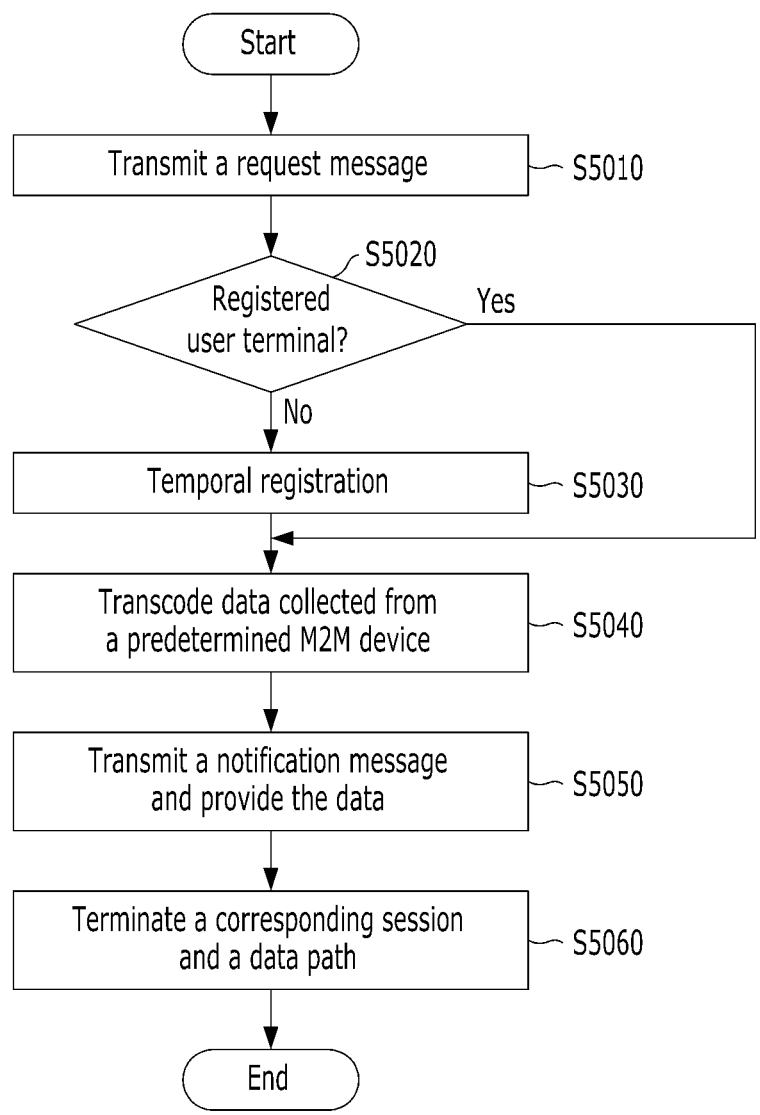
FIG. 5 illustrates a method of providing data collected from a M2M device to unregistered user terminals in accordance with at least one embodiment.

FIG. 5 illustrates a method of providing data collected from a M2M device to unregistered user terminals in accordance with at least one embodiment.

At step S5010, a request message for providing data collected from M2M devices is transmitted to a M2M service server. For example, first user terminal 100 may select data collected from at least one of M2M device 501 to 503 to provide to a target user terminal in response to a user input. First user terminal 100 may transmit a request message to first M2M service server 210 in order to provide the selected data to the target user terminal. The request message may include information on the target user terminal and information on the selected data collected from at least one of M2M devices 501 to 503.

At step S5020, in response to the request message, first M2M service server 210 determines whether the target user terminal is a registered user terminal or an unregistered user terminal. When the target user terminal is a registered user terminal at first M2M service server 210 (Yes-S5020), first M2M service server 210 transcode the selected data to be processable at the target user terminal at step S5040. However, the present invention is not limited thereto. For example, such transcoding may be not necessary. In this case, first M2M service server 210 may transmit a notification message to such a registered user terminal at step S5050.

When third user terminal 300 is not registered as a subscriber of first M2M service server 210 (No-S5020), first M2M service server 210 temporary registers such an unregistered user terminal. For example, first M2M service server 210 may assign a temporal ID to the target user terminal and modify an associated <scl> resource.

At step 5040, first M2M service server 210 transcodes the selected data to be processable at the target user terminal (e.g., third user terminal 300). That is, transcoder 2123 may convert the requested data stored first M2M service provider to a predetermined format data to be processable in at least one of second M2M service server 410 and third user terminal 300.

At step S5050, first M2M service server 210 may transmit a notification message to third user terminal 300 to inform of third user terminal 300 that requested data is available through first IMS platform 220 and second IMS platform 420. After transmitting the notification message, third user terminal 300 may access first M2M service server 210 and obtain the data selected by first user terminal 100. The present invention, however, is not limited thereto. For example, first M2M service server 210 may transmit the requested data to third user terminal 300.

At step S5060, first M2M service server 210 terminates a corresponding session and a data path to third user terminal 300 and performs an accounting process for charging for data exchanged between first M2M service server 210 and third user terminal 300.

Figure 6:
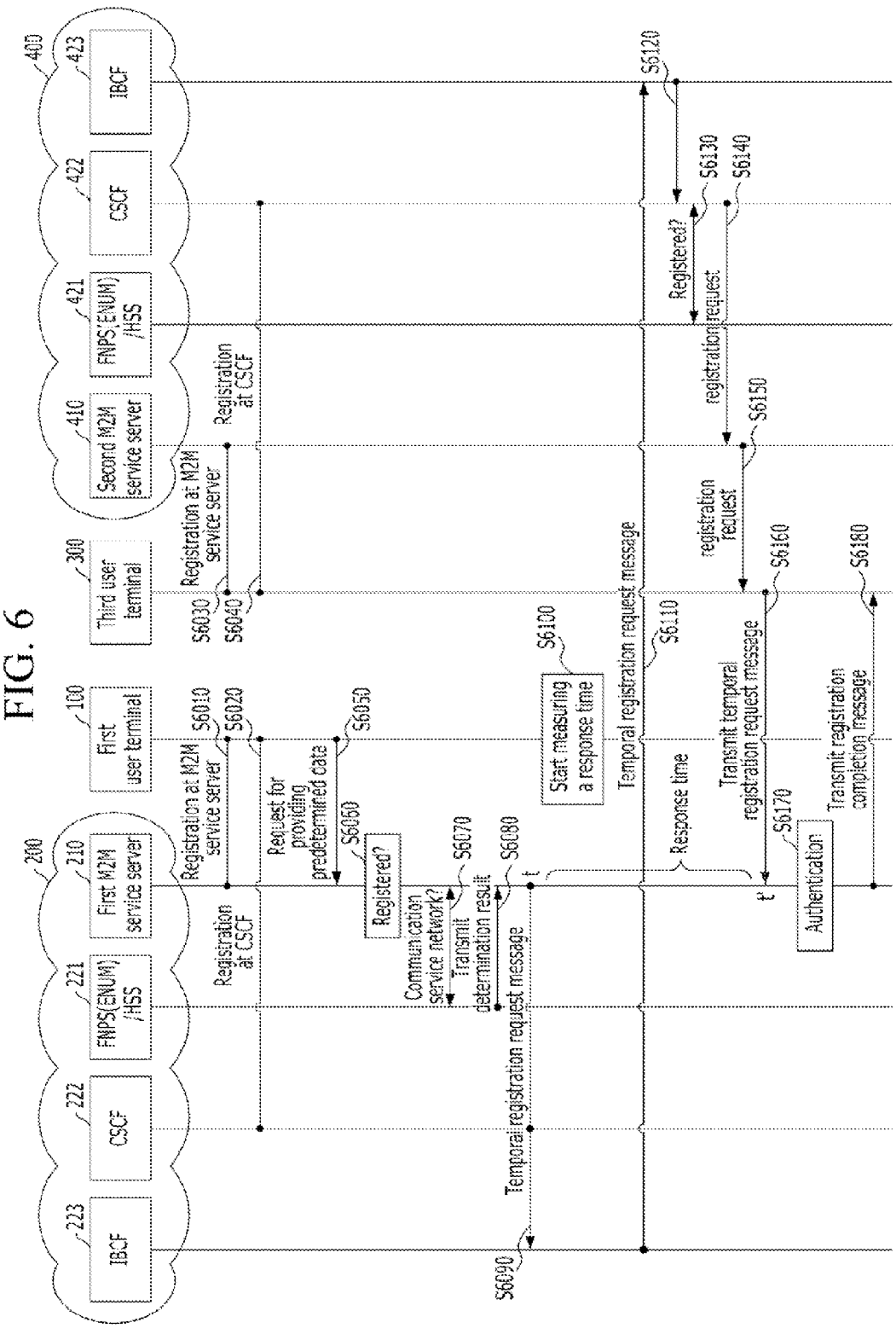
FIG. 6 illustrates temporal registration for an unregistered user terminal for providing M2M data to the unregistered user terminal in accordance with at least one embodiment.

FIG. 6 illustrates temporal registration for an unregistered user terminal for providing M2M data to the unregistered user terminal in accordance with at least one embodiment.

At step S6010, first user terminal 100 is registered at first M2M service server 210 in first communication service network 200 in order to use a M2M service provided by first M2M service server 210.

At step S6020, first user terminal 100 is also registered at call session control function (CSCF) 222 for using a multimedia service provided by first IMS platform 220 in first communication service network 200. For example, first user terminal 100 includes a network application (NA) for using a M2M service provided by first M2M service server 210 and a SIP client for using a multimedia service provided by first IMS platform 220. CSCF 222 may perform SIP based call control and session handing on $3^{rd}$ generation (3G) network.

At step S6030, third user terminal 300 is registered at second M2M service server 410 in second communication service network 400 in order to use a M2M service provided by second M2M service server 410.

At step S6040, third user terminal 300 is registered at CSCF 422 for using a multimedia service provided by second IMS platform 420 in second communication service network 400.

At step S6050, first user terminal 100 transmits a request message to first M2M service serve 210 in order to request first M2M service server 210 to provide predetermined data collected from at least one of M2M devices 501 to 503 to third user terminal 300. In response to the request message, first M2M service server 210 delivers the request message to CSCF 222. The request message may include information on third user terminal 300 (e.g., telephone number of third user terminal 300) and information on the target M2M data to provide.

Although first M2M service server 210 was described as transmitting the request message directly to CSCF 222, the present invention is not limited thereto. For example, first M2M service server 210 may transmit the request message through MTC-interworking function (MTC-IWF). Such transmission method is introduced in Rel-11 SIMTC. Rel-11 SIMTC is standards for Machine type communications (MTC) introduced by $3^{rd}$ generation partnership project (3GPP). Particularly, an SIP message may also be transmitted to CSCF 222 through MTC-interworking function (MTC-IWF) instead of directly transmitted from first M2M service server 210 to CSCF 222. In this example, the MTC-IWF is responsible for relaying a trigger request (e.g., request message) between a M2M service server (e.g., NSCL) located at an external network and network nodes. Such MTC-IWF also provides functions of authenticating a M2M service server, reporting a relay result, and identifying a M2M device/gateway triggered by an HSS function.

At step S6060, CSCF 222 determines whether third user terminal 300 is registered at first M2M service server 210 based on the information included in the request message. For example, CSCF 222 may obtain identification information (e.g., a mobile phone number) of third user terminal 300 included in the request message and determine whether third user terminal 300 is a subscriber of second IMS platform 420 based on the obtained identification information.

At step S6070, CSCF 222 may inquire of flexible number routing & number portability (FNPS) (E.164 number mapping (ENUM)) server/HSS 221 to determine a hosting communication service network of third user terminal 300. FNPS(ENUM) server 221 determines the communication service network of third user terminal 300 based on the identification information (e.g., telephone number) of third user terminal 300. FNPS(ENUM) server 222 may transmit a determination result message to CSCF 222. The determination result message may include information on a domain of third communication network 530. However, the present invention is not limited thereto. HSS 222 may be used to determine a hosting communication service network of third user terminal 300.

At step S6080, CSCF 222 transmits the received determination result message to first M2M service server 210. At step S6090, first M2M service server 210 generates and transmits a temporal registration request message to interconnection border control function (IBCF) 213. IBCF 213 is a network entity that provides control functions for establishing a link between first IMS platform 220 to second IMS platform 420. Although first M2M service server 210 was described as transmitting the temporal registration request message to IBCF 223, the present invention is not limited thereto. Such a temporal registration request message may be transmitted to other network entities that perform the same function of IBCF 223, depending on the specification of a network structure model or a mobile communication service network.

The temporal registration request message may be generated based on the session initiation protocol (SIP) for requesting registering of third user terminal 300 at first M2M service server 210. For example, the temporal registration message may be created in a form of: {Request (Registration), TempAppID(ID_C), SclBaseURI(NSCL_A), SecurityKey(K)}.

TempAppID is an ID of third user terminal 300 that is allocated to be able to identify third user terminal 300 in first M2M service server 210. Such ID is allocated because all user terminals registered at a M2M service server require a unique ID. SclBaseURI is an URI address of first M2M service server 210 in order to enable third user terminal 300 to transmit a temporal registration request message. SecurityKey is an encryption key to be used for authenticating third user terminal 300. Such an encryption key may be compared with a corresponding key upon the receipt of the temporary registration request for registering third user terminal 300 at first M2M service server 210.

At step S6100, first M2M service server 210 may start measuring a response time for temporal registration of third user terminal 300. For example, first M2M service server 210 records "third user terminal 300 is waiting for temporal registration" with an ID (e.g., ID_C) of third user terminal 300 and an encryption key (SecurityKey) and records a time of transmitting the temporal registration request message as a request time t.

At step S6110, IBCF 213 transmits the temporal registration request message received from first M2M service server 210 to IBCF 423 of second communication service network 400 where third user terminal 300 is originally registered for a related service.

At steps S6120 and S6130, IBCF 423 requests CSCF 442 of second communication service network 400 to confirm whether third user terminal 300 is registered with second communication service network 400.

At step S6140, CSCF 442 transmits a corresponding temporal registration request message to third M2M service server 410. At step S6150, third M2M service platform 410 transmits the received temporal registration request message to third user terminal 300. At step S6160, third user terminal 300 transmits the temporal registration request message to first M2M service server 210.

Upon the receipt of the temporal registration request message from third user terminal 300, first M2M service server 210 calculates the response time based on a time t' of receiving the temporal registration request message from third user terminal 300. For example, the total response time is a time period from the transmission time t and the reception time t'.

At step S6170, first M2M service server 210 compares the calculated response time (t'−t) with a maximum response time (Tms) and compares the encryption key included in the received temporal registration request message with an encryption key stored when first M2M service server 210 transmitted the temporal registration request message.

When the response time is less than the maximum response time and the transmitted encryption key is matched with the received encryption key, first M2M service server 210 temporary registers a network application (NA) with the ID of third user terminal 300. That is, first M2M service server 210 authenticates third user terminal 300 through comparing the encryption key included in the transmitted temporal registration request message and that included in the received temporal registration request message. When the encryption keys are matched, first M2M service server 210 temporary registers third user terminal 300. That is, first M2M service server 210 modifies a <scl> resource of first M2M service server 210 for temporally registering third user terminal 300. For modifying the <scl> resource, first M2M service server 210 registers a temporal ID (ID_C) of third user terminal 300 at the <scl> resource, for assigning an access right to third user terminal 300 to access a container storing the requested data, and for adding third user terminal 300 as subscription for the requested data. By modifying the subscription, third user terminal 300 is notified when the requested data is ready to be obtained after transcoding the requested data. At step S6180, first M2M service server 210 transmits a temporal registration completion message to third user terminal 300.

Figure 7:
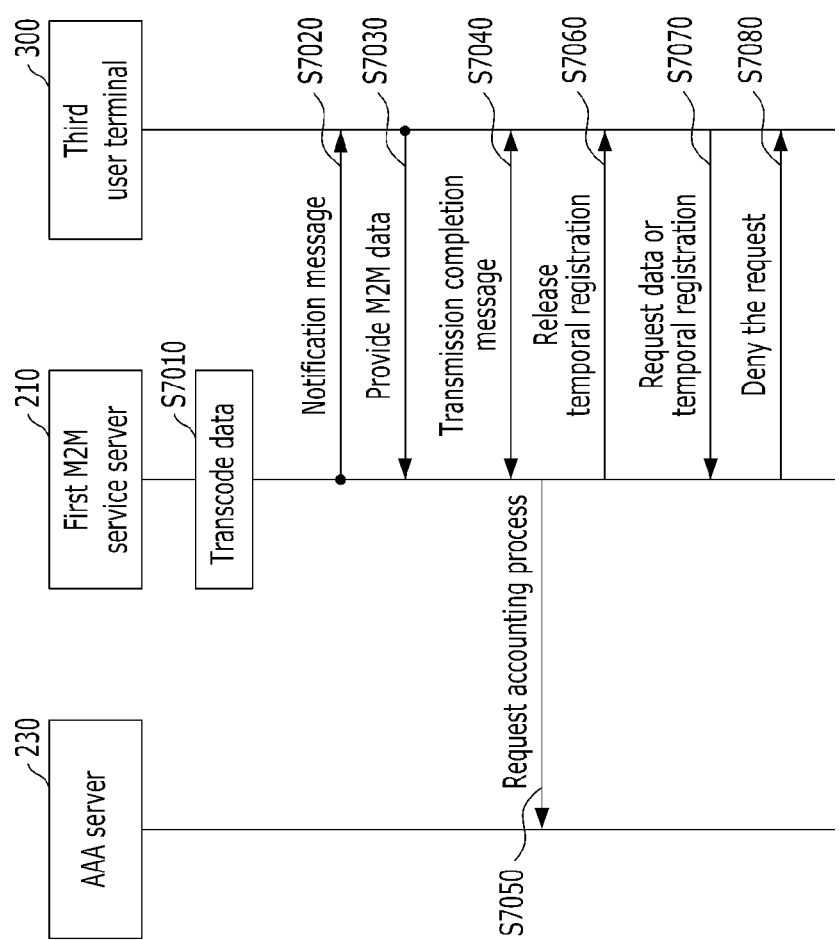
FIG. 7 illustrates transcoding requested M2M data and providing the requested M2M data to an unregistered user terminal in accordance with at least one embodiment.

FIG. 7 illustrates transcoding requested M2M data and providing the requested M2M data to an unregistered user terminal in accordance with at least one embodiment.

Referring to FIG. 7, after completing the temporal registration of third user terminal 300, first M2M service server 210 transcodes the requested data based on information included in the temporal registration request message at step S7010. For example, first M2M service server 210 transcodes the request data to be processable in third user terminal 300. Such transcoding may be performed based on specification of third user terminal 300 stored in the temporal registration request message.

At step S7020, first M2M service server 210 transmits a notification message to third user terminal 300 after transcoding. The notification message may be for notifying of third user terminal 300 that the requested data is ready to be provided.

At step S7030, third user terminal 300 obtains the requested data from first M2M service server 210. Particularly, third user terminal 300 reads the requested data from the container of first M2M service server 210. The present invention, however, is not limited thereto. First M2M service server 210 may transmit the requested data to third user terminal 300. When third user terminal 300 tries to access other data, first M2M service server 210 denies such request because an access right of the corresponding data for third user terminal 300 is not registered in the container of first M2M service server 210.

At step S7040, a transmission completion message is exchanged between first M2M service server 210 and third user terminal 300 after third user terminal 300 completely obtains the requested data.

At step S7050, first M2M service server 210 calculates a packet size of data transmitted to third user terminal 300 upon the transmission completion message. First M2M service server 210 may charge first user terminal 100 based on the calculated packet size, transmit the charging information to AAA server 230 of first communication service network 100, and requests AAA server 230 to perform an accounting process based on the charging information. The present invention, however, is not limited thereto. First M2M service server 210 may charge third user terminal 300 based on the calculated packet size. One of first user terminal 100 and third user terminal 300 may be decided by a subscriber of first user terminal 100.

At step S7060, first M2M service server 210 may release the temporal registration of third user terminal 300. For example, first M2M service server 210 may release the SIP session and the data path established between first M2M service server 210 and third user terminal 300.

At step S7070, third user terminal 300 may request data or temporal registration to first M2M service server 210 after releasing the temporal registration of third user terminal 300. At step S7080, first M2M service server 210 may deny such request from third user terminal 300 (e.g., unregistered user terminal) and transmit an error message to third user terminal 300.

Figure 8:
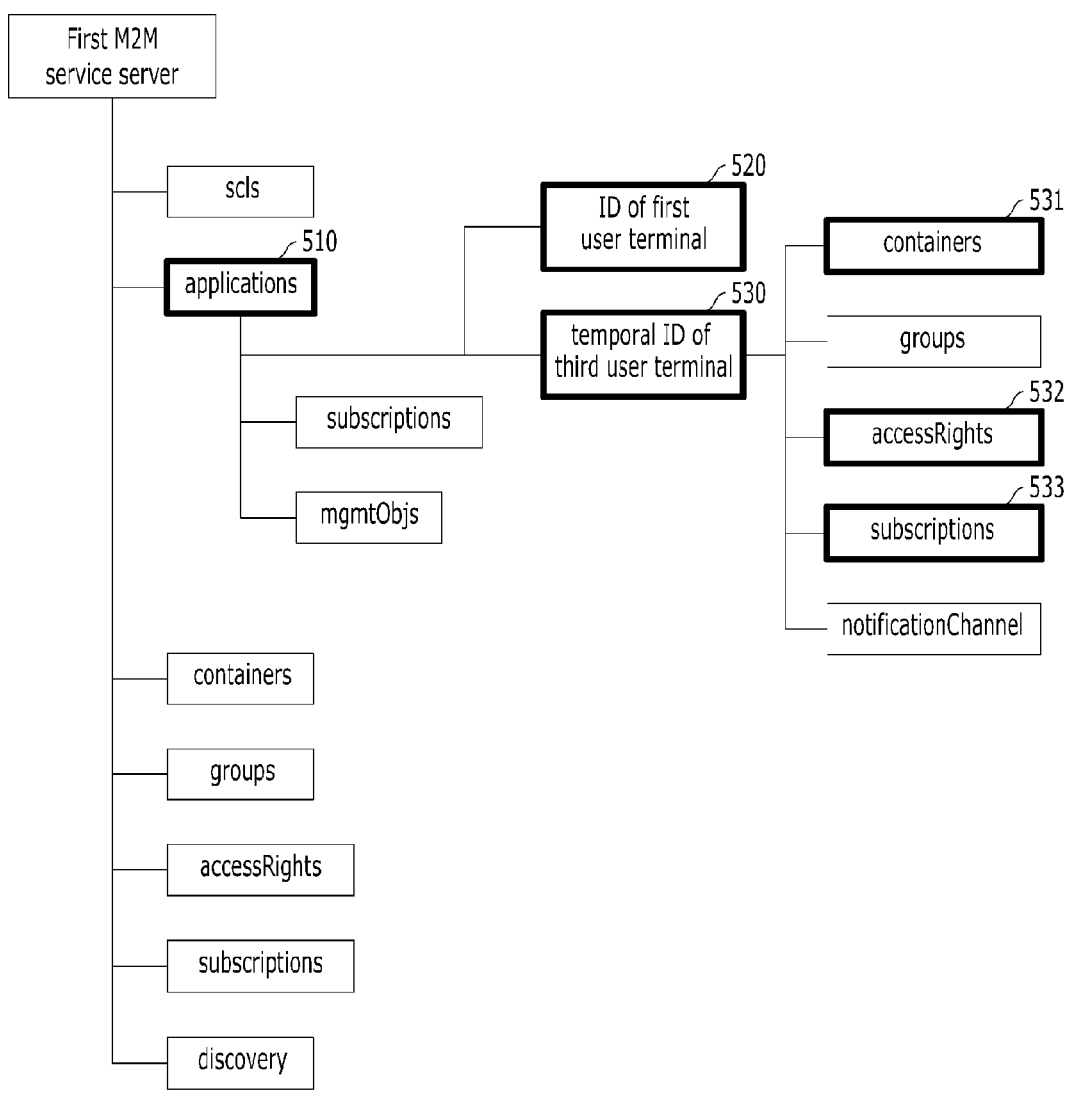
FIG. 8 illustrates a <scl> resource modified for providing M2M data to an unregistered user terminal in accordance with at least one embodiment.

FIG. 8 illustrates a <scl> resource modified for providing M2M data to an unregistered user terminal in accordance with at least one embodiment.

Referring to FIG. 8, in order to provide M2M data to third user terminal 300, first M2M service server 210 temporary registers third user terminal 300 and modify an associated <scl> resource. Particularly, first M2M service server 210 may assign a temporal ID to third user terminal 300 and store temporal ID 530 of third user terminal 300 in <applications> resource 510 as well as ID 520 of first user terminal 100. Furthermore, first M2M service server 210 may create sub-resources of <containers> 531, <accessRights> 532, and <subscriptions> 533, which are linked to temporal ID 530 of third user terminal 300. <accessRights> resource 532 may contain a temporal ID of third user terminal 300 for assigning a right to access predetermined data. <subscriptions> resource 532 may be modified for transmitting a notification message to third user terminal 300 when the request data is ready to be provided after transcoding.

As described above, M2M data may be routed from one M2M service platform to the other using the existing IMS platform. Such a method may enable managing a service profile and quality of service (QoS) per each subscriber. Since the existing IMS network is used for M2M data routing, it is possible to minimize an authentication procedure of an unregistered user terminal that tries to access M2M data. Furthermore, a signal path or a data path may be secured and managed with QoS. An existing accounting procedure may be used to charge for data packets exchanged between two different M2M service platforms.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing data collected from a machine to a machine (M2M) device by a M2M service server to an unregistered user terminal wherein the M2M service server including at least one processor, at least one memory, and a communication circuit, the method comprising:

receiving, through the communication circuit, a request message from a first user terminal registered at the M2M service server to provide predetermined data collected from a M2M device to a second user terminal;

determining, by the at least one processor, whether the second user terminal is a subscriber of the M2M service server;

temporary registering the second user terminal and store registration information in the at least one memory when the second user terminal is not a subscriber of the M2M service server; and providing the predetermined data stored in the at least one memory to the second user terminal through the communication circuit, wherein the providing the predetermined data to the second user terminal includes modifying a resource of the M2M service server to temporarily register the second user terminal, and wherein the method further comprises:

assigning a temporal identification to the second user terminal;

adding the temporal identification of the second user terminal in an <applications> resource;

adding the temporal identification of the second user terminal in an <accessRights> to allow the second user terminal to access the predetermined data; and modifying a <subscriptions> resource to transmit a notification message to the second user terminal when the predetermined data is ready to be provided.

2. The method of claim 1, wherein:

the temporary registering includes transmitting a temporal registration request message to the second user terminal through a first communication service platform of the first user terminal and a second communication service platform of the second user terminal; and performing the temporary registering upon receipt of a registration request message from the second user terminal.

3. The method of claim 2, wherein:

the temporal registration message is an session initiation protocol (SIP) message that includes at least one of information on an address of the second communication service platform, a temporary ID of the second user terminal, and an encryption key.

4. The method of claim 2, wherein the transmitting a temporal registration request message includes:

determining domain information on a second communication network of the second user terminal from an associated server; and transmitting the temporal registration request message to the second user terminal using the determined domain information of the second communication network.

5. The method of claim 2, wherein the temporary registering the second user terminal includes:

generating an encryption key for sharing the control right with the second user terminal;

creating a temporal registration request message including the generated encryption key;

transmitting the temporal registration request message to the second user terminal; and performing an authentication process upon receipt of a registration request message from the second user terminal.

6. The method of claim 5, wherein the performing an authentication process includes:

comparing the generated encryption key with an encryption key included in the registration request message from the second user terminal.

7. The method of claim 1, wherein the providing the predetermined data to the second user terminal includes:

transcoding the predetermined data based on information on the second user terminal included in the temporal registration request message.

8. The method of claim 7, comprising:

transmitting a notification message to the second user terminal to inform that the predetermined data is ready to be provided.

9. The method of claim 1, comprising:

calculating a fee of providing the predetermined data to the second user terminal; and requesting a server to perform an associated accounting process based on the calculated fee.

10. The method of claim 9, comprising:

charging at least one of the first user terminal and the second user terminal based on the calculated fee for providing the predetermined data to the second user terminal.

11. A machine to machine (M2M) service server of providing data collected from at least one M2M device to an unregistered user terminal, the server comprising: at least one memory, a communication circuit, and at least one processor, wherein the at least one processor is configured to:

receive, through the communication circuit, a request message from a first user terminal registered at the M2M service server to provide predetermined data collected from a M2M device to a second user terminal;

determine whether the second user terminal is a subscriber of the M2M service server;

temporarily register the second user terminal and store registration information in the at least one memory when the second user terminal is not a subscriber of the M2M service server; and provide the predetermined data to the second user terminal through the communication circuit, wherein the at least one processor is configured to:

assign a temporal identification to the second user terminal;

add the temporal identification of the second user terminal in an <applications>resource of a <scl> resource of the M2M service server;

adding the temporal identification of the second user terminal in an <accessRights> resource of the <scl> resource of the M2M service server to allow the second user terminal to access the predetermined data and modifying a <subscriptions> resource of the <scl> resource of the M2M service server to transmit a notification message to the second user terminal when the predetermined data is ready to be provided.

12. The M2M service server of claim 11, wherein the at least one processor is configured to:

transmit a temporal registration request message to the second user terminal through a first communication service platform of the first user terminal and a second communication service platform of the second user terminal; and perform the temporary registering upon receipt of a registration request message from the second user terminal.

13. The M2M service server of claim 12, wherein:

the temporal registration message is an session initiation protocol (SIP) message that includes at least one of information on an address of the second communication service platform, a temporary ID of the second user terminal, and an encryption key.

14. The M2M service server of claim 12, wherein the at least one processor is configured to:
  determine domain information on a second communication network of the second user terminal from an associated server; and
  transmit the temporal registration request message to the second user terminal using the determined domain information of the second communication network.

15. The M2M service server of claim 12, wherein the at least one processor is configured to:
  generate an encryption key for sharing the control right with the second user terminal;
  create a temporal registration request message including the generated encryption key;
  transmit the temporal registration request message to the second user terminal; and
  perform an authentication process upon receipt of a registration request message from the second user terminal.

16. The M2M service server of claim 11, wherein the at least one processor is configured to:
  transcode the predetermined data based on information on the second user terminal included in the temporal registration request message;
  transmit a notification message to the second user terminal to inform that the predetermined data is ready to be provided.

17. The M2M service server of claim 11, wherein the at least one processor is configured to:
  calculate a fee of providing the predetermined data to the second user terminal; and request a server to perform an associated accounting process based on the calculated fee in order to charge at least one of the first user terminal and the second user terminal based on the calculated fee for providing the predetermined data to the second user terminal.

* * * * *